2,929,420
TABLE SAW SET WORKS
Harold Buster Gresdel, Klamath Falls, Oreg.

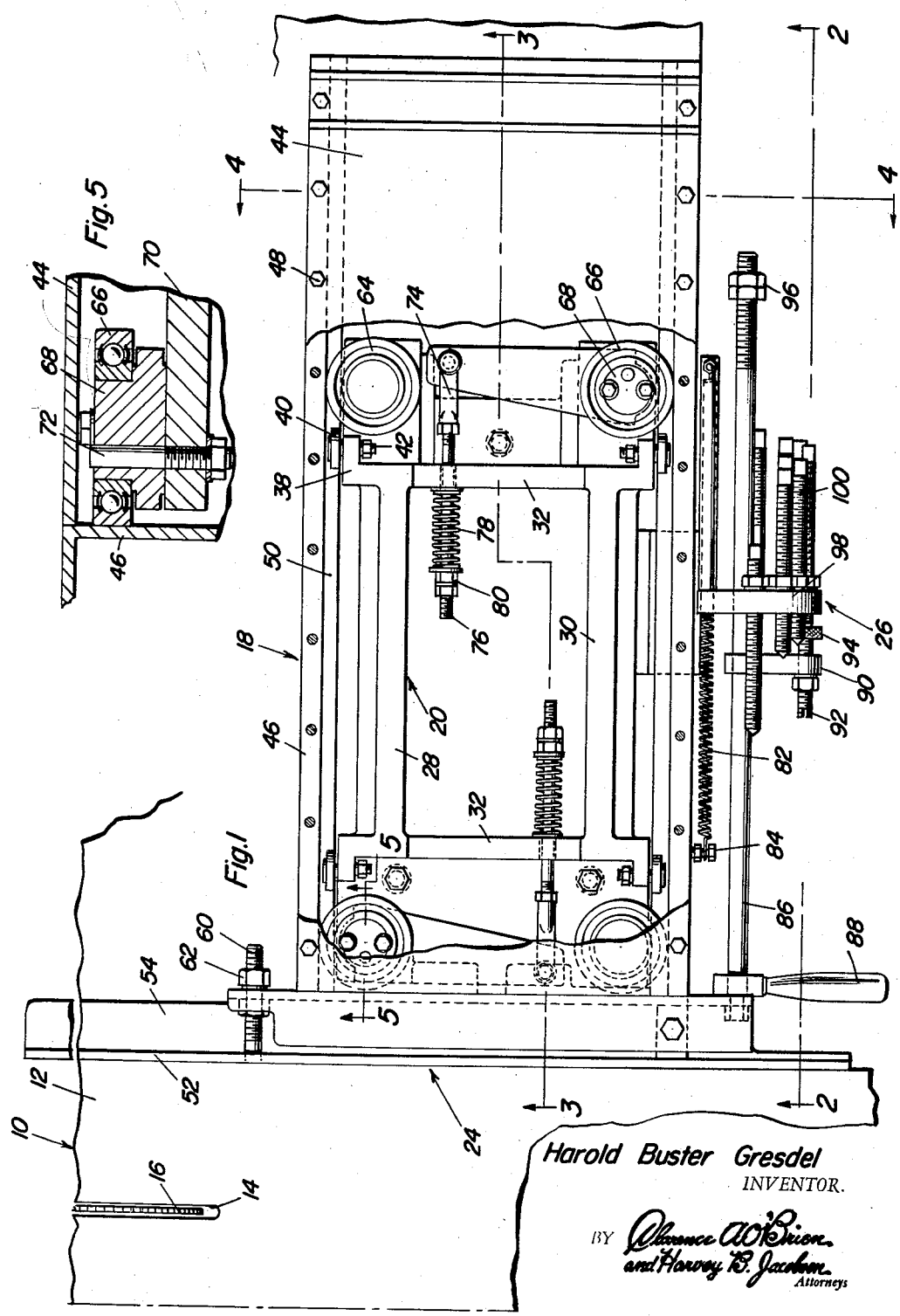

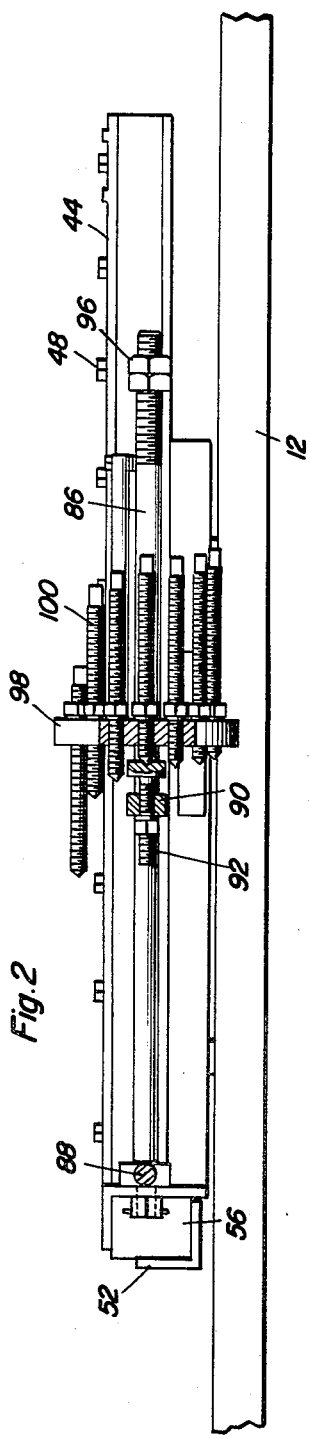
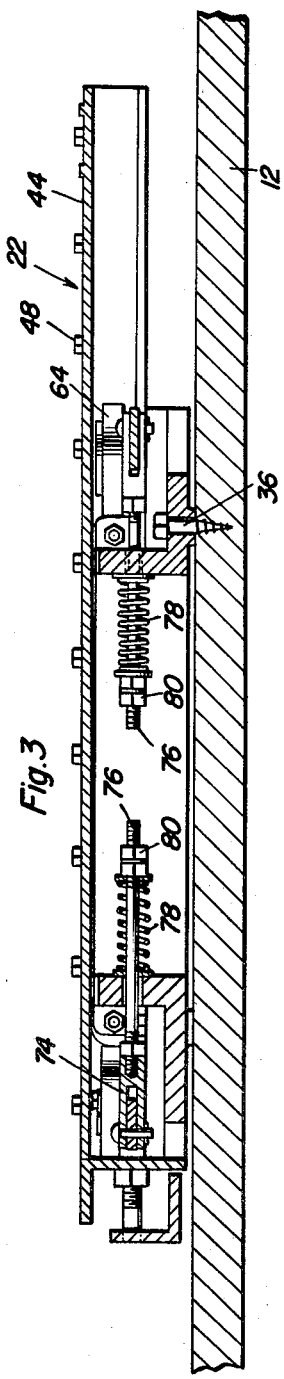
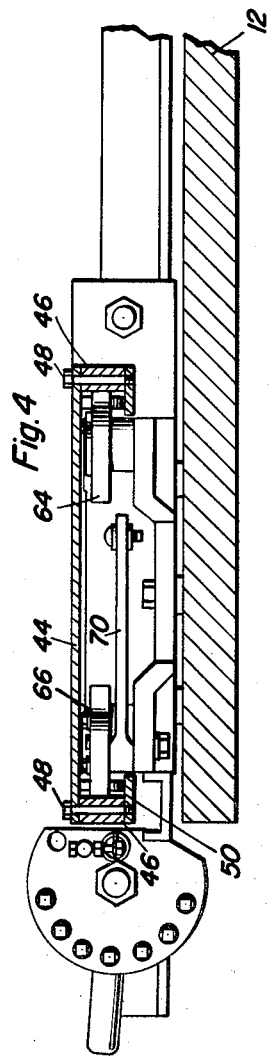
Harold Buster Gresdel
INVENTOR.

Application March 31, 1958, Serial No. 725,445

3 Claims. (Cl. 143—174)

The present invention generally relates to table saws and is a direct improvement on the device disclosed in prior Patent No. 2,796,092 issued June 18, 1957.

The primary object of the present invention is to provide a table saw set works for use in conjunction with table saws and especially table rip saw machines in which there is provided a carriage movably supported on a base in which the carriage and base are spaced and supported by a multiplicity of ball bearing assemblies which reduce the force required to move the carriage.

Another object of the present invention is to provide a table saw set works in accordance with the preceding object in which diagonally opposed of the horizontally mounted ball bearing assemblies are spring biased outwardly into contact with a portion of the carriage whereby the spring bias on the eccentrically mounted ball bearing assemblies will maintain an accurate relationship between the base and the carriage.

A further object of the present invention is to provide a table saw set works which incorporates a mechanism for automatically taking up any wear and removing all horizontal side movement between the carriage and the base and to eliminate any change in the parallel relationship between the saw line and the straight edge.

A further important feature of the present invention is to provide a single adjustment feature for adjusting the device to compensate for differences in the kerf of saw blades.

Yet another important object of the present invention is to provide a table saw guide device which is simple in construction, easy to use, efficient for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, in which:

Figure 1 is a plan view of the table saw set works with portions of the carriage removed illustrating the structural details of the invention;

Figure 2 is a side elevational view taken substantially upon a plane passing along reference line 2—2 of Figure 1 illustrating the adjacent mechanism for the kerf of the saw;

Figure 3 is a longitudinal, vertical sectional view taken substantially upon a plane passing along section line 3—3 of Figure 2 illustrating further structural details of the mechanism for exerting lateral pressure onto the horizontal radial roller bearings;

Figure 4 is a transverse, vertical sectional view taken substantially upon a plane passing along section line 4—4 of Figure 1 and illustrating further structural details of the invention; and Figure 5 (sheet 1) is a detail sectional view taken substantially upon a plane passing along section line 5—5 of Figure 1 illustrating the structural details of the eccentric mounting for the radial ball bearings.

Referring now to the drawings in detail, there is provided a table saw generally designated by reference numeral 10 which includes a flat table 12 having a slot 14 formed therein and projecting upwardly through the slot 14 in a saw blade 16. Other components of the saw table and saw are not illustrated since they form no part of the present invention.

Mounted on the table 12 adjacent the saw blade 16 is the saw set works of the present invention which are generally designated by reference numeral 18 which includes a base generally designated by the numeral 20, a carriage generally designated by numeral 22 (Figure 3), a work guide generally designated by numeral 24 and an adjusting means generally designated by numeral 26.

The base 20 includes a pair of transversely spaced longitudinally extending rails 28 and 30 which are interconnected at their ends by transverse rails or frame members 32. The transverse rails 32 are preferably of angle iron construction and the horizontal flange thereof is secured to the table 12 by suitable fasteners 36 (Figure 3). Each end of the transverse rails 32 projects beyond the longitudinal rails 28 and 30 and terminates in a longitudinal extension 38 (Figure 1) having a roller 40 mounted thereon by virtue of a shaft 42 which roller is journaled about a transverse horizontal axis and is disposed in a vertical plane. It is pointed out that four rollers are provided on the base and the four rollers are disposed at the corners of the base.

The carriage 22 includes a plate 44 which overlies and is secured to side rail members 46 with the plate being secured thereto by fastening bolts 48 or the like. The side rail members 46 lie alongside of the rollers 40 and the rollers 40 engage the undersurface of the plate 44. The lower edge of each side rail member 46 is provided with an inwardly extending flange 50 which is secured in position by the fasteners 48. Thus, the carriage 22 is precluded from being removed vertically from the base unless the fasteners 48 are removed for disassembling the carriage. However, the carriage may move longitudinally on the base with the rollers reducing the force necessary to move the carriage.

The guide 24 includes an elongated straight edge 52 which is vertically disposed and which extends transversely of the base 20 and the carriage 22 and is parallel to the saw blade 16. Secured to the lower edge of the straight edge 52 is a flange 54 which projects towards the base 20. The guide 24 also includes a mounting block 56 at one end thereof. The end of the carriage is provided with a depending flange 58 which extends laterally beyond the carriage and receives a screw threaded stop member 60 having nuts 62 thereon for securing the guide 24 to the carriage 22 with the stop nuts 62 adapted to adjust the guide flange 52 to a desired position.

Supported at diagonally opposed points on the base are radial ball bearings 64 which engage the inner surface of the side rails 46.

At the other diagonally opposed corners ball bearing assemblies 66 are adjustably mounted on the cylindrical end 68 of an elongated arm 70 which is supported from a plate 70 carried by the base by a supporting pin 72 which is eccentric in relation to the pivotal axis of the arm 70 whereby pivotal movement of the arm 70 will cause rotation about the eccentric pin 72 thus moving the ball bearing 66 laterally against the side rails 46.

The free end of the arm 70 is provided with a clevis 74 pivotally attached thereto with the clevis being attached to a threaded rod 76 extending through the transverse frame member 32 with a spring 78 encircling the threaded member and retained thereon by nuts 80 whereby the spring 78 may be compressed for varying the force exerted on the arm 70 which is a force urging the ball bearings 66 into engagement with the side rails 48.

A spring 82 is anchored at one end to the base and at the other end to the carriage as indicated by numeral 84 which continuously urges the carriage to the right.

Mounted on the forward transverse member is an elongated rod 86 rotatable about its longitudinal axis and having a handle 88 rigidly affixed to one end thereof. Mounted on the rod 86 is a stop plate 90 having an adjustable stop screw 92 extending therethrough and having an abutment 94 on the end thereof remote from the table. The other end of the rod 86 is provided with end nuts 96. Secured to the base 20 is a plate 98 having a plurality of threaded members 100 extending therethrough each of which has lock nuts and polygonal rear ends with the forward ends of the members 100 adapted to engage the abutment 94 when the rod 86 is rotated to align the abutment with the particular screw threaded abutment or adjustment member which enables the carriage to be set for orientation in a plurality of spaced relations to the saw table.

In the use of the present invention, the stop pins or threaded members are adjusted with respect to the block so that they project a predetermined distance so that when the stop flange 94 engages one of the threaded members 100, the carriage will be located a predetermined distance from the saw blade so that a board of a predetermined width may be sawed. The pins 100 may be staggered in any desired manner for ripping boards at the desired width. In the actual operation of the invention the guide is pulled to the left against the tension of spring 82 and the stop members are set up in a conventional manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A table saw set works comprising a substantially rectangular base securable to a saw table, a carriage, said carriage being in the form of an elongated plate overlying and wider than said base, roller means mounted on horizontal axes on the base for engagement with the plate for supporting the plate for ease of movement longitudinally thereof, means depending from the plate engaging beneath the rollers for preventing vertical movement of the plate and carriage relative to the base, said base including a plurality of rollers each mounted for rotation about a vertical axis near a corner of said base and engaging the carriage for further guiding the carriage, diagonally opposed of said rollers being spring urged outwardly for contact with the depending means on the carriage to prevent relative movement of the carriage on the base except for longitudinal movement of the carriage.

2. The structure as defined in claim 1 wherein said diagonally opposed of said rollers includes only a single pair of said rollers, and L-shaped arm mounted on the base for pivotal movement at the apex thereof with one end of the arm carrying a roller and the other end of the arm having means for attachment to a spring, a resilient spring attached to the other end of the arm and the base for urging the rollers into contact with the carriage for preventing lateral movement thereof.

3. The structure defined in claim 1 wherein said base and carriage are provided with interconnected adjustable means for limiting said longitudinal movement of the carriage to predetermined relationship to the base.

References Cited in the file of this patent

UNITED STATES PATENTS

| | | |
|---|---|---|
| 1,098,751 | Newton | June 2, 1914 |
| 2,556,548 | Modderman | June 12, 1951 |
| 2,619,173 | Crain | Nov. 25, 1952 |
| 2,796,092 | Gresdel | June 18, 1957 |
| 2,808,084 | Eschenburg et al. | Oct. 1, 1957 |